United States Patent [19]

Steppler et al.

[11] Patent Number: 5,104,451
[45] Date of Patent: Apr. 14, 1992

[54] USE OF FLUIDIZED BED ASH IN A FINISHING MORTAR

[75] Inventors: Klaus Steppler, Altdorf; Rudolf Ostrowski, Nuremberg, both of Fed. Rep. of Germany

[73] Assignee: Norina Bautechnik GmbH, Nuremberg, Fed. Rep. of Germany

[21] Appl. No.: 580,848

[22] Filed: Sep. 11, 1990

[30] Foreign Application Priority Data

Sep. 14, 1989 [DE] Fed. Rep. of Germany ....... 3930693

[51] Int. Cl.$^5$ .............................................. C04B 7/13
[52] U.S. Cl. .................................. 106/705; 106/775; 106/DIG. 1
[58] Field of Search .................. 106/705, DIG. 1, 775

[56] References Cited

U.S. PATENT DOCUMENTS

| 4,108,677 | 8/1978 | Valiga ................................. 106/775 |
| 4,256,504 | 3/1981 | Dunstan, Jr. ................. 106/DIG. 1 |
| 4,353,749 | 10/1982 | Ray et al. ........................... 106/775 |
| 4,470,850 | 9/1984 | Bloss ............................. 106/DIG. 1 |
| 4,495,162 | 1/1985 | Jons et al. ........................... 106/775 |
| 4,657,561 | 4/1987 | Itoh et al. ............................. 106/705 |

FOREIGN PATENT DOCUMENTS

| 1077130 | 3/1960 | Fed. Rep. of Germany . |
| 3324708 | 1/1985 | Fed. Rep. of Germany . |
| 3726903 | 2/1989 | Fed. Rep. of Germany . |
| 3808519 | 6/1989 | Fed. Rep. of Germany . |

OTHER PUBLICATIONS

Article: Verwertungskonzept fur Reststoffe aus Kohlenkraftwerken, VGB Kraftwerkstechnik 68, Nov. 1988.
Entsorgung von Reststoffen aus der Rauchgasreinigung bei Grossfeuerungsanlagen Zement–kalik–Gips Nr. Nov./1988.

Primary Examiner—William R. Dixon, Jr.
Assistant Examiner—Anthony J. Green
Attorney, Agent, or Firm—Mathews, Woodbridge & Collins

[57] ABSTRACT

A mortar for the production of a floor is prepared from a mixture of anhydrite binder, sand, fluidized bed ash from the fluidized bed firing of a sulfur-bearing fuel such as coal, water and a selection of additives, resulting in advantageous technological properties.

18 Claims, No Drawings

USE OF FLUIDIZED BED ASH IN A FINISHING MORTAR

BACKGROUND OF THE INVENTION

A problem which is the subject of increasing attention at the present time is the environmentally sound disposal of waste materials such as materials resulting from various industrial and technical procedures. One such material is fluidised bed ash which is produced in large quantities in the combustion of fuels which preferably have a high content of ballast or inerts, more especially coal, in a fluidised bed firing process. In order to bind the sulfur present in the fuels, calcium oxide or calcium carbonate is added to the firing chamber, with the result that the ash produced includes inter alia a comparatively high proportion of anhydrous calcium sulfate (10–10%). Further reference is made to this below.

The use of fluidised bed ash for the production of additive materials, for example for lightweight concrete or dry building plates and panels is referred to in German laid-open application (De-OS) No 38 08 519. In that procedure the fluidised bed ash upon being discharged from the firing installation is treated inter alia with a binding agent such as cement, lime or gypsum. German laid-open application (De-OS) No 33 24 708 discloses the use of fluidised bed ash in building materials for underground working or mining, for example for building dams or embankments, columns or piers.

German laid-open application (DE-OS) No 37 26 903 refers to the use of blast furnace slag as a hydraulic binding agent for the production of a liquefied floor finishing mortar. As the chemical composition of blast furnace slag is not comparable to the ash which is produced in a fluidised bed firing process, and that applies in particular in regard to the content of anhydrous calcium sulfate, the results obtained in relation to such a floor material cannot be applied to mortar based on a different binding agent.

German published specification (DE-AS) No 10 77 130 discloses the use of crushed slag as an additive for a floor mortar on an anhydrite basis. However, no information is contained therein about the origin or composition of the slag.

A special modification of anhydrous calcium sulfate, as referred to above in connection with the composition of fluidised bed ash, is the calcium sulfate contained in the anhydrite binder in accordance with German standard DIN 4208 (March 1984). That modification, which is referred to for the sake of simplicity hereinafter as 'anhydrite', is made into a binder material (DIN 4208) by the addition of what can be referred to as activators, for example builder's lime or potassium sulfate, and that material, by the addition of sand and water, can be made into a mortar for the production of finished floors (see German standard DIN 18353, August 1974). The material properties required in that respect from the hardened floor, such as flexural tensile strength, are set forth in German standard DIN 18560, part 2.

For the production of such an anhydrite plaster use is made of anhydrites which come from natural deposits, being therefore referred to as natural anhydrite, or anhydrites which occur in a chemical working operation, for example in the production of hydrofluoric acid from fluorite, referred to as synthetic anhydrite.

SUMMARY OF THE INVENTION

An object of the present invention is to provide a further area of use for a fluidised bed ash in order thereby to provide for disposal thereof in a more environmentally acceptable fashion.

Another object of the present invention is to provide a mortar material for the production of floors, which is of a simple composition using readily available materials.

In accordance with the principles of the invention, these and other objects are achieved by the provision of a mortar by mixing fluidised bed ash with an anhydrite binder, sand, water and at least one additive from the group consisting of thinning or liquifying agents, dispersing agents, stabilisers and antifoaming agents.

The mortar material produced in that way not only contributes to solving the problem of disposal of fluidised bed ash but in the course of setting thereof it surprisingly also provides particularly advantageous properties. Furthermore, the costs of providing raw materials for the mortar material are also moderated by the (partial) replacement of natural or synthetic anhydrite by fluidised bed ash. It will be appreciated that the above-mentioned additive materials may be used individually and also in the form of a mixture.

The fluidised bed ash used in accordance with the teaching of this invention comes from the firing installations referred to above. The composition thereof will depend substantially on the nature of the fuel which undergoes combustion in the firing installation thereof. The proportion of fluidised bed ash in the mortar material according to the invention also depends inter alia on its composition. When burning coal with a comparatively high sulfur content, for example 3%, the proportion of fluidised bed ash used may be higher than when dealing with an ash originating from the fluidised bed combustion of a fuel containing a relatively small amount of sulfur. Simple tests based on the above-mentioned German standards (DIN) make it possible in each specific situation to ascertain the composition which is most suitable for the production of a finished or skimmed floor of a given quality.

When dealing with a mortar material of pasty or doughy consistency, which after being spread over the base or substrate bed is compacted by tamping or ramming and then provided with a flat level surface by an operation referred to as drawing-off to smooth the surface, the ash component may be up to 80%. Preferably, the ash component is between about 20 and 50% by weight. In regard to the required flexural tensile strength (reference is directed in that respect to the German standard DIN 4109) and the required heave or swelling values, particularly good results can be achieved with an ash component in the range of from about 20 to 40% by weight. The values in percent by weight which are set out above and also hereinafter, in respect of the ash component, are related to the dry mortar mix, that is to say not the wet mortar material (made up from dry mortar material plus water).

When dealing with finishing or skimming mortars which are used in what is known as a float finishing or skimming process which does not involve the above-mentioned tamping and drawing-off operations because the rheological properties of the mortar material promote spreading thereof on the substrate bed or base and levelling of the surface thereof, the upper limit of the ash component is about 60% by weight. In regard to the attainment of the appropriate flexural tensile strength and heave value, particularly good results can be obtained with an ash component of between about 20 and 40% by weight. With ash components which are markedly above 60% by weight, that can result in the undesirable phenomenon of settlement of the ash in the wet mortar material.

The anhydrite binder used for the finishing mortar according to the invention complies with above-mentioned German standard DIN 4208. The fluidised bed ash used can be taken from the fluidised bed firing installation downstream of the fluidised bed, a cyclone separator or a filter forming part of that installation.

The amount of mixing or make-up water used to prepare the wet mortar material corresponds to a water/solids ratio of about 0.20–0.28, preferably about 0.22–0.26.

The proportion of sand in the mortar material according to the invention can be matched to the proportion of $SiO_2$ contained in the fluidised bed ash so that it is possible to achieve a reduction in the costs of providing the raw materials for the mortar material, by virtue of a saving on sand. With an $SiO_2$-content in the ash of around 40% by weight, the addition of sand can be reduced by about 30% in comparison with the state of the art, while for a float floor of adequate strength, the proportion of sand only needs to be between about 10 and 20% by weight with respect to the dry mortar mix. The leaning ratio which is most appropriate in a specific situation can once again be ascertained by carrying out simple tests based on the above-mentioned German standards (DIN). The grain size of the sand should be less than about 1.2 mm.

It has been found in practice that, when carrying the principles of the invention into effect the raw material costs for a float floor can be reduced by between about 25 and 35%, in comparison with the state of the art. In that connection, besides the above-mentioned reduction in the amount of sand used, the partial replacement of synthetic or natural anhydrite by the fluidised bed ash is an aspect of particular significance. Depending on the calcium sulfate content of the ash the anhydrite/ash ratio is advantageously between 1:1 and 4:1, preferably between about 3:2 and 4:3. The amount of anhydrite is generally between about 40 and 70% by weight, preferably between about 45 and 60% by weight, with respect to the total content of solids in the mortar material.

The invention will now be further described and in greater detail with reference to the following Examples.

EXAMPLE 1

A fluidised bed ash according to the invention, originating from the fly dust of a fluidised bed firing installation and which upon analysis showed the following values was used to prepare a floor finishing or skimming mortar:

| | |
|---|---|
| Silicon dioxide | 42.1% by weight |
| Iron (III) oxide | 5.1% by weight |
| Aluminium oxide | 17.2% by weight |
| Calcium oxide | 16.8% by weight |
| Magnesium oxide | 1.6% by weight |
| Potassium oxide | 2.89% by weight |
| Sodium oxide | 0.55% by weight |
| Sulfate | 8.9% by weight |

Those values are used as a basis for calculating the content of the ash in respect of the following:

| | |
|---|---|
| Sand | 42.10% by weight |
| CaSO$_4$ | 15.13% by weight |
| CaO | 10.57% by weight |

The above-mentioned ash, after having been adjusted to a grain size of <0.5 mm, was used to produce a dry mortar mix of the following composition:

| | |
|---|---|
| Synthetic anhydrite (DIN 4208) | 50.54% by weight |
| Quartz sand (grain size 0.7–1.2 mm) | 11.88% by weight |
| Fluidised bed ash (see above) | 35.68% by weight |
| Activator (K$_2$SO$_4$) | 0.89% by weight |
| Dispersion powder | 0.24% by weight |
| Liquefying agent | 0.48% by weight |
| Antifoaming agent | 0.24% by weight |
| Stabiliser (to resist sedimentation) | 0.05% by weight |
| | 100.00% by weight |

The above-indicated thinning agent is sulfite- or sulfonic acid-modified resin based on an amino-s-triazine with at least two NH$_2$ groups.

Such an amount of mixing or make-up water was added to that dry mortar mix that the water/solids ratio was 0.24. A wet mortar mix was produced in that way, which can be used in a float skimming process.

The flexural tensile strength of the above-indicated mortar mix, determined in accordance with German standard DIN 4208, was 4.0 N/mm$^2$ after a setting time of 3 days and 6.6 N/mm$^2$ after 7 days.

The heave or swelling values were as follows:

| | |
|---|---|
| After 2 days | 0.61 mm/m |
| After 3 days | 0.68 mm/m |
| After 4 days | 0.71 mm/m |
| After 5 days | 0.72 mm/m |
| After 6 days | 0.71 mm/m |
| After 7 days | 0.71 mm/m |

Those values can be considered to be very good.

EXAMPLE 2

A dry mortar mix of the following composition was made using the ash as set forth in Example 1:

| | |
|---|---|
| Synthetic anhydrite (DIN 4208) | 62.0% by weight |
| Quartz sand (grain size of less than 1.2 mm) | 16.0% by weight |
| Fluidised bed ash (grain size smaller than 0.7 mm) | 20.0% by weight |
| Activator (K$_2$SO$_4$) | 0.93% by weight |
| Dispersion powder | 0.30% by weight |
| Liquefying agent | 0.48% by weight |
| Antifoaming agent | 0.24% by weight |
| Stabiliser (to resist sedimentation) | 0.05% by weight |
| | 100.00% by weight |

The thinning agent was sulfite- or sulfonic acid-modified resin based on an amino-s-triazine with at least two NH$_2$ groups.

An amount of mixing or make-up water was added to that dry mortar mix such that the water/solids ratio was 0.20. That resulted in a wet mortar mix which can be used in a float skimming process.

The flexural tensile strength of the above-indicated mortar mix, determined in accordance with German standard DIN 4208, was 3.75 N/mm$^2$ after a setting time of 3 days and 6.2 N/mm$^2$ after 7 days.

It will be appreciated that the foregoing description is in respect of preferred compositions and procedures in accordance with the principles of the present invention and that various other modifications and alterations may be made therein without thereby departing from the spirit and scope of the invention.

We claim:

1. A composition comprising:
   an anhydrite binder comprising anhydrous calcium sulfate; and
   approximately 20 to 50% by weight of fluidized bed ash, said bed ash being derived from the fluidized firing of sulfur bearing fuel to which has been added an additive selected from the group consisting of calcium oxide and calcium carbonate, so that said bed ash comprises anhydrous calcium sulfate wherein there is a ratio of anhydrite binder to bed ash in said composition of between 1:1 and 4:1.

2. The composition as recited in claim 1 further comprising from about 10 to 20% by weight of sand.

3. The composition as recited in claim 1 further comprising water in ana mount sufficient to result in a water to solids ratio of from about 0.20 to 0.28.

4. The composition as recited in claim 1 wherein the amount of ash is from about 20 to 40% by weight.

5. The composition as recited in claim 1 wherein the amount of said anhydrite binder is from about 40 to 70% by weight.

6. The composition as recited in claim 1 wherein the anhydrite binder further comprises an activator.

7. The composition as recited in claim 6 wherein the activator is selected from the group consisting of lime and potassium sulfate.

8. A process of forming a mortar for the production of floors comprising the steps of:
   forming a dry mixture composition for use in a mortar, the composition comprising:
   an anhydrite binder comprising anhydrous calcium sulfate; and
   approximately 20 to 50% by weight of fluidized bed ash, said bed ash being derived from the fluidized firing of sulfur bearing fuel to which has been added an additive selected from the group consisting of calcium oxide and calcium carbonate, so that said bed ash comprises anhydrous calcium sulfate;
   adding water to said dry mixture in an amount sufficient to form the mortar so that the mortar is suitable for making a floor.

9. The process as recited in claim 8, wherein there is from about 10 to 20% by weight of sand.

10. The process as recited in claim 8 wherein the ratio of anhydrite binder to ash is between 1:1 and 4:1.

11. The process as recited in claim 10 wherein there is from about 10 to 20% by weight of sand.

12. The process as recited in claim 10 wherein the amount of ash is from about 20 to 50% by weight.

13. The process as recited in claim 12 wherein the amount of ash is from about 20 to 40% by weight.

14. The process as recited in claim 13 wherein the amount of anhydrite binder is from about 40 to 70% by weight.

15. The process as recited in claim 8 wherein the amount of water results in a water to solids ratio of from about 0.20 to 0.28.

16. The process as recited in claim 8 wherein the anhydrite binder further comprises an activator.

17. A flooring material comprising:
   an anhydrite binder comprising anhydrous calcium sulfate; and
   approximately 20 to 50% by weight of fluidized bed ash, said bed ash being derived from the fluidized firing of sulfur bearing fuel to which has been added an additive selected from the group consisting of calcium sulfate and calcium carbonate, so that said bed ash comprises anhydrous calcium sulfate,
   wherein there is a ratio of anhydrite binder to bed ash of between 1:1 and 4:1.

18. The flooring material as recited in claim 17 wherein the anhydrite binder further comprises an activator.

* * * * *

UNITED STATES PATENT AND TRADEMARK OFFICE
CERTIFICATE OF CORRECTION

PATENT NO. : 5,104,451

DATED : April 14, 1992

INVENTOR(S) : Klaus Steppler and Rudolf Ostrowski

It is certified that error appears in the above-identified patent and that said Letters Patent is hereby corrected as shown below:

On the title page: Item [75] Inventors, should read -- Klaus Steppler, Rudolf Ostrowski and Erich Hoellfritsch.

Claim 3, line 2, should read "prising water in an amount sufficient to result in a water"

Signed and Sealed this

Twentieth Day of July, 1993

Attest:

MICHAEL K. KIRK

*Attesting Officer*   Acting Commissioner of Patents and Trademarks